US011927155B2

(12) United States Patent
Martin et al.

(10) Patent No.: US 11,927,155 B2
(45) Date of Patent: Mar. 12, 2024

(54) EVAPORATIVE EMISSIONS CANISTER WITH INTEGRATED PORT INTERFACE

(71) Applicant: DELPHI TECHNOLOGIES IP LIMITED, St. Michael (BB)

(72) Inventors: Thomas Rodrigues Martin, Auburn Hills, MI (US); Antonio Leandro Marques, Piracicaba (BR); Richard Hoag, Caledonia, NY (US); Maria Rocio Lemaster, Auburn Hills, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 18/206,244

(22) Filed: Jun. 6, 2023

(65) Prior Publication Data

US 2023/0400000 A1 Dec. 14, 2023

Related U.S. Application Data

(60) Provisional application No. 63/350,268, filed on Jun. 8, 2022.

(51) Int. Cl.
*F02M 25/08* (2006.01)

(52) U.S. Cl.
CPC .... *F02M 25/0854* (2013.01); *F02M 25/0836* (2013.01)

(58) Field of Classification Search
CPC ........................ F02M 25/0854; F02M 25/0836
See application file for complete search history.

(56) References Cited

U.S. PATENT DOCUMENTS 10,018,160 B2 7/2018 Bartus et al.
2008/0223343 A1* 9/2008 Ammermann ..... F02M 25/0836 123/520

FOREIGN PATENT DOCUMENTS

CN 110630411 A 12/2019
KR 200395963 Y1 9/2005

OTHER PUBLICATIONS

Extended European Search Report from the European Patent Office in application No. EP23177747, dated Nov. 7, 2023.

* cited by examiner

*Primary Examiner* — Kevin A Lathers
(74) *Attorney, Agent, or Firm* — WARNER NORCROSS + JUDD LLP

(57) ABSTRACT

An evaporative emissions canister is provided. The evaporative emissions canister includes a body defining an internal volume therein for receiving one or more volumes of adsorbent. The canister body includes a port for receiving an accessory component. The port is in fluid communication with the internal volume. A sleeve seal is disposed in the port. A mounting bracket extends outwardly from the canister body. The canister body supports the accessory component, and the accessory component is secured to the canister body, thereby eliminating a hose and connector fittings between the canister body and the accessory component. A fuel system assembly including the evaporative emissions canister is also provided. A method of connecting an accessory component to an evaporative emissions canister is further provided.

15 Claims, 1 Drawing Sheet

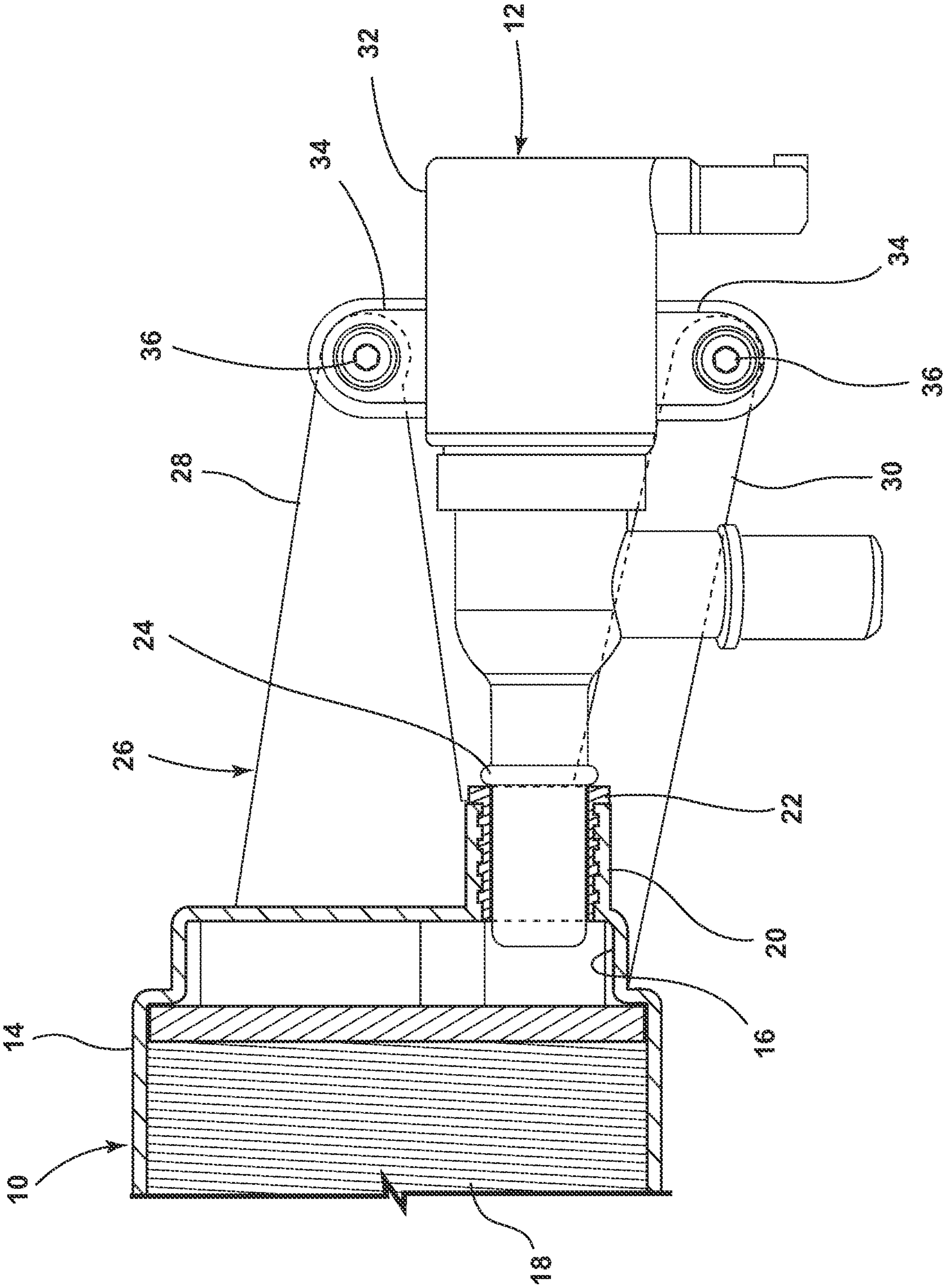
12
32
34
34
36
36
28
30
24
26
22
20
16
14
10
18

EVAPORATIVE EMISSIONS CANISTER WITH INTEGRATED PORT INTERFACE

CROSS-REFERENCE TO RELATED APPLICATIONS

This application claims the benefit of U.S. Provisional Application No. 63/350,268, filed Jun. 8, 2022, the disclosure of which is incorporated by reference in its entirety.

FIELD OF THE INVENTION

The disclosure generally relates to evaporative emissions canisters and, more specifically, to interfaces between evaporative emissions canisters and accessory components.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ adsorbents such as activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge and purge ports for fuel vapor are communicated with one end of the gas passage, while an atmospheric port (vent port) for fuel vapor is communicated with the other end of the gas passage, thus allowing for charging of the canister. During stoppage of the vehicle (e.g., when parked), fuel vapor generated from the fuel in the fuel tank is introduced through the charge port into the canister and adsorbed by the adsorbent. During operation of the engine, atmospheric air is introduced through the atmospheric vent port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

One or more of the ports of the casing may be connected to a valve or other accessory component by a hose or other similar conduit including connector fittings on each end. For example, the conduit may be a pre-formed, multi-layer hose including a quick connector fitting at each end, with one of the quick connectors being connected to one of the ports in the casing and the other quick connector being connected to a port of the accessory component. However, the use of quick connectors and an intermediate hose add to the cost and space requirements of the assembly, and introduce potential leak interfaces at each of the quick connections.

BRIEF SUMMARY

An evaporative emissions canister including a body defining an internal volume therein is provided. The canister body includes a port for receiving an accessory component. The port is in fluid communication with the internal volume. A mounting bracket extends outwardly from the canister body. The accessory component is receivable within the port, and the accessory component is fastenable to the mounting bracket to secure the accessory component to the body.

In specific embodiments, a sleeve seal is disposed in the port, and the accessory component is mateable with the sleeve seal.

In particular embodiments, the sleeve seal is tubular in shape, and a male port of the accessory component is insertable into the sleeve seal.

In specific embodiments, the mounting bracket and the body are monolithic in construction.

In particular embodiments, the mounting bracket and the body are formed of a single molded piece.

In specific embodiments, the mounting bracket is adjacent to the port.

In specific embodiments, the port of the body is a female port, and the accessory component includes a male port that is receivable in the female port of the body.

In specific embodiments, the accessory component is attached to the mounting bracket with at least one fastener.

In specific embodiments, the mounting bracket includes a first arm and a second arm, and each of the first arm and the second arm is separately attachable to the accessory component.

In specific embodiments, the accessory component is attachable to an end of each of the first arm and the second arm.

A fuel system assembly including the evaporative emissions canister is also provided. An accessory component is received in the port of the evaporative emissions canister. The evaporative emissions canister is attached to the mounting bracket with at least one fastener. The mounting bracket of the canister body supports the accessory component, and the accessory component is secured to the canister body, thereby eliminating a hose and connector fittings between the canister body and the accessory component.

In specific embodiments, a sleeve seal is disposed in the port. The sleeve seal provides a sealing engagement between the accessory component and the evaporative emissions canister.

In specific embodiments, the accessory component is an auxiliary valve.

In specific embodiments, the accessory component includes a housing having at least one flange, and the at least one flange is connected to the mounting bracket by the at least one fastener.

In specific embodiments, the at least one fastener comprises a self-tapping screw.

A method of connecting an accessory component to the evaporative emissions canister is also provided. The method includes providing the evaporative emissions canister. The method further includes inserting a male port of the accessory component into the port of the evaporative emissions canister. The method also includes fastening the accessory component to the mounting bracket of the evaporative emissions canister.

DESCRIPTION OF THE DRAWINGS

Various advantages and aspects of this disclosure may be understood in view of the following detailed description when considered in connection with the accompanying drawing, wherein:

FIG. 1 is a side view of an evaporative emissions canister in accordance with some embodiments of the disclosure, the evaporative emissions canister attaching and supporting an accessory component thereto.

DETAILED DESCRIPTION OF THE INVENTION

An evaporative emissions canister is provided. Referring to FIG. 1, the evaporative emissions canister 10 is illustrated and generally designated as a fuel vapor storage canister for a fuel tank of a vehicle fuel system that pumps liquid fuel, by way of non-limiting example gasoline fuel, from the fuel tank (not shown) to an internal combustion engine (not shown) that powers an automotive vehicle. The evaporative emissions canister 10 traps fuel vapors that arise in the fuel tank during periods of non-use of the internal combustion engine due to, for example, daily variations in ambient temperatures. The evaporative emissions canister 10 exhibits an improved, more compact, and less costly interface with accessory components.

FIG. 1 generally depicts the evaporative emissions canister 10 and an accessory component 12 such as an auxiliary fuel system valve or other component used in a vehicle fuel system and having a male port. The canister 10 includes a body 14 such as a casing, housing, or similar that defines an internal volume 16 inside of the body 14 and that houses the internal components of the canister. The internal volume 16 includes a bed 18 of at least one volume of adsorbent material such as an activated carbon or similar that adsorbs evaporative emissions such as fuel vapor to prevent these vapors from escaping to the atmosphere. Adsorbed fuel vapors may also be purged from the internal volume 16 of the evaporative emissions canister and directed to an air intake of an internal combustion engine to which the evaporative emissions canister is connected. The internal structure, internal components, and adsorb/desorb function of the evaporative emissions canister 10 may be that of any evaporative emissions canister known in the art. The body 14 of the canister 10 includes at least one port 20 that is in fluid communication with the internal volume 16 and that provides an inlet and/or outlet for fluid flow into and/or out of the body 14. The port 20 is adapted to receive the accessory component 12. Particularly, the port 20 is a female port such as a female SAE port in which a sleeve seal 22 is disposed. The port 20 and sleeve seal 22 provide an interface for a male port 24 of the accessory component 12 such as a male SAE port. The male port 24 is inserted into and received in the female port 20 and corresponding sleeve seal 22, and the sleeve seal 22 provides a sealing engagement between the accessory component 12 and the evaporative emissions canister 10.

The evaporative emissions canister 10 further includes a mounting bracket 26 that extends outwardly from the body 14 in the proximity of and adjacent to the port 20. For example, the mounting bracket 26 may extend to the side of the body 14 in the same direction that the port 20 faces. In specific embodiments, the body 14 and the mounting bracket 26 may be monolithic in construction and may be formed, for example, as a single molded piece. The mounting bracket 26 may include first and second cantilevered arms 28, 30 that each terminate at a free end. The first arm 28 may be spaced from the second arm 30, and the first arm 28 may diverge from the second arm 30 in a direction from the body 14 towards the free ends. The first arm 28 may have the same shape as the second arm 30, or as shown in FIG. 1, the arms 28, 30 may differ from each other in shape, such as the first arm 28 generally being a triangular or trapezoidal shaped flange and the second arm 30 being a generally linear, rectangular shaped link bar. The first arm 28 and the second arm 30 are separately attachable to the accessory component 12. Particularly, the accessory component 12 is attached to the terminal end of each of the first arm 28 and the second arm 30 with a fastener such as a self-tapping screw, a rivet, a nut and bolt, or similar. For example, the accessory component 12 may include a housing 32 from which a pair of flanges 34 extend, and one of the flanges 34 is connected to the terminal end of the first arm 28 with a self-tapping screw 36 while the other one of the flanges 34 is connected to the terminal end of the second arm 30 with another self-tapping screw 36. Alternatively, the accessory component 12 may be attached and secured to the evaporative emissions canister 10 by providing the accessory component 12 and mounting bracket 26 with integrally molded, complementary locking features that interlock when assembled. The body 14 including the mounting bracket 26 thereby supports the accessory component 12 and secures the accessory component 12 thereto, with the male port 24 of the accessory component 12 securely inserted and sealed in the female port 20 of the evaporative emissions canister 10, without the need for quick connect couplings and/or hose conduits between the male port 24 and female port 20. Instead, the accessory component 12 is essentially directly connected to the evaporative emissions canister 10.

The mounting bracket 26 of the canister body 14 and the accessory component 12 are shown by specific example in FIG. 1. However, it should be understood that mounting bracket 26 may have a different shape, geometry and/or configuration so as to be connectable to other accessory components (e.g. other valves) having a different shape, geometry and/or configuration than shown. The disclosed canister body and associated mounting bracket can be applied, for example, to any other fuel vapor canister accessories that have a male SAE port or that would otherwise require a hose assembly to connect the accessory to the canister.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. An evaporative emissions canister comprising:

a body defining an internal volume therein for receiving one or more volumes of adsorbent, the body including a port for receiving an accessory component, the port being in fluid communication with the internal volume; and a mounting bracket extending outwardly from the body;

wherein the mounting bracket includes a first arm and a second arm, and each of the first arm and the second arm is separately attachable to the accessory component;

wherein the accessory component is receivable within the port, and the accessory component is fastenable to the mounting bracket to secure the accessory component to the body.

2. The evaporative emissions canister of claim 1, wherein a sleeve seal is disposed in the port, and the accessory component is mateable with the sleeve seal.

3. The evaporative emissions canister of claim 2, wherein the sleeve seal is tubular in shape, and a male port of the accessory component is insertable into the sleeve seal.

4. The evaporative emissions canister of claim 1, wherein the mounting bracket and the body are monolithic in construction.

5. The evaporative emissions canister of claim 4, wherein the mounting bracket and the body are formed of a single molded piece.

6. The evaporative emissions canister of claim 1, wherein the mounting bracket is adjacent to the port.

7. The evaporative emissions canister of claim 1, wherein the port of the body is a female port, and the accessory component includes a male port that is receivable in the female port of the body.

8. The evaporative emissions canister of claim 1, wherein the accessory component is attached to the mounting bracket with at least one fastener.

9. The evaporative emissions canister of claim 1, wherein the accessory component is attachable to an end of each of the first arm and the second arm.

10. A fuel system assembly comprising:

the evaporative emissions canister of claim 1;

the accessory component received in the port of the evaporative emissions canister;

the evaporative emissions canister being attached to the mounting bracket with at least one fastener;

whereby the mounting bracket of the canister body supports the accessory component, and the accessory component is secured to the canister body, thereby eliminating a hose and connector fittings between the canister body and the accessory component.

11. The fuel system assembly of claim 10, including a sleeve seal disposed in the port, the sleeve seal providing a sealing engagement between the accessory component and the evaporative emissions canister.

12. The fuel system assembly of claim 10, wherein the accessory component is an auxiliary valve.

13. The fuel system assembly of claim 10, wherein the accessory component includes a housing having at least one flange, and the at least one flange is connected to the mounting bracket by the at least one fastener.

14. The fuel system assembly of claim 10, wherein the at least one fastener comprises a self-tapping screw.

15. A method of connecting an accessory component to an evaporative emissions canister, the method comprising:

providing the evaporative emissions canister of claim 1;

inserting a male port of the accessory component into the port of the evaporative emissions canister; and fastening the accessory component to the mounting bracket of the evaporative emissions canister.

* * * * *